United States Patent Office 2,800,256
Patented July 23, 1957

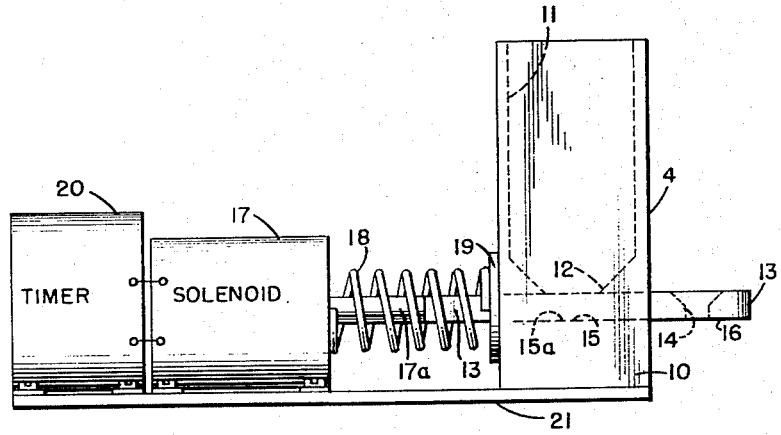

2,800,256
FLOWABLE-MATERIAL DISPENSER
Salvatore A. Di Nuzzo, Mineola, N. Y.

Application January 4, 1954, Serial No. 402,116

2 Claims. (Cl. 222—333)

General

This invention relates to flowable-material dispensers and, more particularly, to automatic fish-food particle dispensers.

Various flowable-material dispensers have previously been proposed which, in general, are more cumbersome and complex and hence more costly than is desirable for some applications such as, for example, fish-food dispensing applications. Moreover, in the absence of critical timing of each particle-dispensing interval, some prior particle dispensers are not adapted periodically to dispense a fairly precisely determined small quantity of particles, such as, for example, .02 ounce of ordinary food particles as may be required for each feeding of fish in a relatively small tank.

One prior fish-food dispenser periodically automatically dispenses the entire quantity of fish food contained in each of a series of individual storage compartments. This prior dispenser has the disadvantage of requiring separate compartments which may be individually emptied for storing discrete quantities of fish food and thus is more complex than may be desirable.

It is an object of the present invention to provide a new and improved flowable-material dispenser of simple construction which is capable of periodically dispensing with minimized congestion discrete relatively small predetermined quantities of particles.

It is another object of the present invention to provide a new and improved automatic fish-food particle dispenser capable of dispensing discrete relatively small and fairly precisely determined quantities of fish-food particles and which does not require critical timing during each particle-dispensing interval and in which congestion is minimized.

In accordance with a particular form of the invention, a dispenser of solid particles comprises a reservoir for solid particles and having an outlet through which the particles can pass but which is subject to congestion by the particles and a member displaceable relative to the outlet for normally closing the outlet when in a first position and having a bore therethrough communicating with the outlet in a predetermined second position of the member. The dispenser also includes means disposed in intimate contact with a surface of the member when the member is in the aforesaid predetermined second position for closing one end of the bore when the bore communicates with the aforesaid outlet to form a quantity-determining chamber and a normally deenergized solenoid for displacing the member to the aforesaid predetermined second position upon energization and for transmitting vibrations to the reservoir while energized to allow a predetermined quantity of particles to flow into the chamber and a spring for restoring the member to said first position upon deenergization of the solenoid to discharge the predetermined quantity of particles.

For a better understanding of the present invention, together with other and further objects thereof, reference is had to the following description taken in connection with the accompanying drawing, and its scope will be pointed out in the appended claims.

In the accompanying drawing, the figure represents a flowable-material dispenser constructed in accordance with the invention.

Description of flowable-material dispenser

Referring now more particularly to the drawing, there is represented a flowable-material dispenser constructed in accordance with the invention and comprising a support 10 including a flowable-material reservoir, for example, a fish-food particle reservoir 11, shown in broken-line construction, having an outlet 12 which preferably is vertically disposed. The reservoir 11 preferably is sufficiently large to contain a quantity of fish-food particles (not shown) which is several times that required for a single feeding of the fish in a given fish tank to be serviced. The support 10 may, for example, be constructed of suitable cylindrical plastic stock having a central axial bore therein to form the reservoir 11.

The dispenser includes a member displaceable relative to the outlet 12, preferably comprising a suitable plastic bar 13 of rectangular cross section disposed in a horizontal slot 15 of similar dimensions in the support 10 and horizontally slidable across the lower end of the outlet 12 for closing the same in a first position thereof. The bar 13 preferably has a flared bore 14, shown in broken-line construction, vertically disposed for communication with the outlet 12 in a second position of the bar 13. A collar 19 may be mounted on the bar 13 for a purpose explained subsequently.

The support 10 for the bar 13 and the reservoir 11 preferably includes means comprising, for example, a horizontal surface 15a of the slot 15 disposed in intimate contact with a surface 16 of the member 13 when the member 13 is in the aforesaid second position for closing one end of the bore 14 when the bore communicates with the outlet 12 to form a quantity-determining chamber bounded by the surface 15a and the walls of the bore 14.

The dispenser also includes actuating means for displacing the member 13 to the aforesaid second position to allow a predetermined quantity of material to flow into the chamber 14, 15a and for restoring the member 13 to the first position, for example, as shown in the drawing to discharge the predetermined quantity of material. More particularly, the actuating means comprises, for example, a normally de-energized time-controlled solenoid 17 having an armature 17a mechanically connected by any suitable means (not shown) to the member 13 for displacing the member to the aforesaid second position upon energization and for vibrating the member 13 and the reservoir 11 to fill the chamber 14, 15a during a predetermined brief time interval. The actuating means preferably also includes a spring 18 wound about the member 13 and armature 17a between a face of the solenoid 17 and the collar 19 of the member 13 for restoring the member 13 to its initial position upon de-energization of the solenoid to discharge the material from the chamber 14, 15a.

There may also be provided time-controlled electrical means comprising, for example, a timer 20 of conventional construction electrically coupled to the solenoid 17 for alternately energizing and de-energizing the same. The timer 20, solenoid 17, and support 10 may all be attached by any suitable means to a mounting frame 21 which, in turn, may for example, be connected to a fish tank (not shown) with the support 10 extending over the water.

Operation of flowable-material dispenser

Considering now the operation of the dispenser represented in the drawing, during intervals between feedings, the solenoid 17 is normally de-energized and the bar 13 is maintained in the position shown in the drawing by the spring 18 which braces the collar 19 against an outer wall of the support 10. During such intervals, the outlet 12 is closed by the upper surface of the bar 13.

At a time determined by the timer 20, the timer causes the energization of the solenoid 17 which displaces the bar 13 to provide communication between the bore 14 and the outlet 12. At this time, a quantity of fish-food particles determined by the dimensions of the chamber formed by the walls of the bore 14 and the surface 15a flows from the reservoir 11 into the chamber. The solenoid may remain energized for an interval of, for example, 30 seconds to 5 minutes or more during which the chamber is filled with fish-food particles. Accordingly, after a given minimum interval elapses, the chamber will be filled to its predetermined capacity regardless of the duration of the time interval during which the solenoid is energized, and thus, the duration of the chamber-filling interval is not critical. During the interval when the solenoid is energized, slight vibrations thereof caused by energization may be transmitted through the mounting frame 21 and the member 13 to the reservoir 11 to aid in causing the particles to flow from the reservoir 11 to the chamber 14, 15a.

After the chamber is filled, the timer 20 causes the de-energization of the solenoid 17. The spring 18 then exerts a force on the collar 19 which returns the member 13 to the position shown in the drawing to discharge the predetermined quantity of fish-food particles stored in the chamber 14, 15a. The dispenser then remains in this operating condition until the solenoid is again energized after an interval of, for example, 24 hours.

From the foregoing description, it will be apparent that a flowable-material dispenser constructed in accordance with the invention has the advantage of dispensing at periodic intervals a small quantity of material which is fairly precisely determined by the dimensions of a storage chamber which may be filled from a reservoir during a time interval which is not critical. The dispenser thus is capable of dispensing substantially the same quantity of material at timed intervals which may extend over a relatively long period since the reservoir supply is only slightly depleted by each dispensation. The device also has the advantage of simple construction and is relatively inexpensive to manufacture.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:
1. An automatic dispenser of solid particles comprising: a reservoir for solid particles and having an outlet through which the particles can pass but which is subject to congestion by the particles; a member displaceable relative to said outlet for normally closing said outlet when in a first position and having a bore therethrough communicating with said outlet in a predetermined second position of said member; means disposed in intimate contact with a surface of said member when said member is in said predetermined second position for closing one end of said bore when said bore communicates with said outlet to form a quantity-determining chamber; a normally de-energized solenoid for displacing said member to said predetermined position upon energization and for transmitting vibrations to said reservoir while energized to allow a predetermined quantity of said particles to flow into said chamber; and a spring for restoring said member to said first position upon de-energization of said solenoid to discharge said predetermined quantity of said particles.

2. An automatic fish-food particle dispenser comprising: a fish-food particle reservoir having a vertically disposed outlet subject to congestion by the fish-food particles; a bar horizontally slidable across the lower end of said outlet for normally closing said outlet when in a first position and having a vertically disposed bore therethrough communicating with said outlet in a predetermined second position of said bar; a support for said bar and said reservoir and having a horizontal surface disposed in intimate contact with a horizontal surface of said bar for closing the lower end of said bore when said bore communicates with said outlet to form a quantity-determining chamber; a normally de-energized solenoid having an armature attached to said bar for displacing said bar to said predetermined second position upon energization and for vibrating said bar and reservoir to allow a predetermined quantity of fish-food particles to flow into said chamber to fill said chamber during a predetermined brief time interval; and a spring for restoring said bar to said first position upon de-energization of said solenoid to discharge said predetermined quantity of fish-food particles.

References Cited in the file of this patent
UNITED STATES PATENTS

| | | |
|---|---|---|
| 1,378,572 | Stevens | May 17, 1921 |
| 1,989,298 | Tingley | Jan. 29, 1935 |
| 2,325,441 | Tucker et al. | July 27, 1943 |
| 2,369,251 | Reynolds | Feb. 13, 1945 |
| 2,410,692 | Strobell | Nov. 5, 1946 |
| 2,538,413 | Chard | Jan. 16, 1951 |
| 2,704,171 | Cole | Mar. 15, 1955 |
| 2,709,541 | Mettler | May 31, 1955 |